United States Patent
Freiburg et al.

(10) Patent No.: US 7,565,452 B2
(45) Date of Patent: Jul. 21, 2009

(54) SYSTEM FOR STORING AND RENDERING MULTIMEDIA DATA

(75) Inventors: Volker Freiburg, Stuttgart (DE); Gerd Spalink, Stuttgart (DE); Peter Wagner, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 804 days.

(21) Appl. No.: 11/051,408

(22) Filed: Feb. 4, 2005

(65) Prior Publication Data

US 2005/0177626 A1    Aug. 11, 2005

(30) Foreign Application Priority Data

Feb. 6, 2004   (EP) .................. 04002702

(51) Int. Cl.
*G06F 15/16* (2006.01)
*G06F 12/00* (2006.01)

(52) U.S. Cl. ...................... 709/246; 709/231
(58) Field of Classification Search ................ 709/246, 709/231, 217, 218; 725/116
See application file for complete search history.

(56) References Cited

U.S. PATENT DOCUMENTS

| | | | |
|---|---|---|---|
| 5,708,828 A * | 1/1998 | Coleman | 715/205 |
| 6,278,466 B1 * | 8/2001 | Chen | 345/473 |
| 6,292,847 B1 | 9/2001 | Nishimoto et al. | |
| 2001/0016112 A1 * | 8/2001 | Heo et al. | 386/95 |
| 2002/0120634 A1 * | 8/2002 | Min et al. | 707/200 |
| 2002/0143972 A1 * | 10/2002 | Christopoulos et al. | 709/231 |
| 2004/0057704 A1 * | 3/2004 | Katsuo et al. | 386/125 |
| 2005/0177626 A1 * | 8/2005 | Freiburg et al. | 709/219 |

FOREIGN PATENT DOCUMENTS

| | | |
|---|---|---|
| EP | 1 291 850 | 3/2003 |
| GB | 2 332 772 | 6/1999 |
| WO | WO 00/67261 | 11/2000 |

* cited by examiner

*Primary Examiner*—Zarni Maung
(74) *Attorney, Agent, or Firm*—Oblon, Spivak, McClelland, Maier & Neustadt, P.C.

(57) ABSTRACT

A system for storing and rendering multimedia data includes a first storage configured to store multimedia data files of a plurality of formats. The system also includes a second storage configured to store program files including information regarding a transformation of multimedia data files of a first format into multimedia data files of a second format, where the first format is one of the plurality of formats. The system also includes a rendering device configured to render multimedia data files of the second format. At least one of the multimedia data files stored in the first storage is linked to at least one of the program files, and the program file includes information regarding a transformation of multimedia data files of the format of the at least one of the multimedia data files into the second format.

21 Claims, 3 Drawing Sheets

SYSTEM FOR STORING AND RENDERING MULTIMEDIA DATA

The invention relates to a system for storing and rendering multimedia data and a method for rendering multimedia data making use of said system.

In the last years, the number of data formats for storing/representing multimedia data has been steadily increased. This makes it possible to improve the handling of multimedia data since for every specific purpose a "individual" data format can be used. The increase in number of data formats however also causes problems as far as compatibility is concerned. If, for example, new data formats become available, corresponding rendering algorithms need to be updated within the rendering device in order to render the multimedia data contained within the new data formats. If such an update process fails, the rendering device can not render the multimedia data. There may also be the problem that new rendering algorithms may not be capable to render multimedia data contained within old data formats which are not supported by the new rendering algorithm.

It is an object of the present invention to provide a system for storing and rendering multimedia data which avoids compatibility problems in the case when new data formats/new rendering algorithms are added.

To solve this object, the present invention provides a system for storing and rendering multimedia data according to claim 1. Further, the present invention provides a method for rendering multimedia data according to claim 13. Last, a computer program product and a computer readable storage means according to claims 14 and 15 are provided. Preferred embodiments of the present invention are defined in respective subclaims.

According to the present invention, a system for storing and rendering multimedia data comprises:

- a multimedia content archive for storing multimedia data files to be rendered,
- a transforming algorithm archive for storing transforming algorithm description files comprising information for transforming multimedia data files of a first format into multimedia data files of a second format, respectively, wherein each stored multimedia data file is individually linked to at least one of the transforming algorithm description files,
- at least one rendering device being connected to the multimedia content archive and the transforming algorithm archive, the at least one rendering device being capable of rendering a specific multimedia data file in dependence of transforming algorithm description files to which the specific multimedia data file is linked to, respectively.

An important aspect of the present invention is that to each multimedia data file at least one "individual" link is assigned. In other words, each multimedia data file has its "own" link. This link is preferably created at the time the multimedia data file is added to the multimedia content archive. Thus, a change/removal of a link being assigned to a specific multimedia data file does not affect other links being assigned to other multimedia data files. In contrast, existing storing/rendering systems generally handle links being assigned to multimedia data files on a file extension basis. In other words, in this storing/rendering systems only one single "common" link is used for a plurality of multimedia data files. Further, in said existing storing/rendering systems, the links (common links) being assigned to the multimedia data files do not point to transforming algorithm description files, but to executable transforming/rendering algorithms. For example, in a Microsoft Windows PC environment, all multimedia data files having the file name extension "pdf" are linked to the same executable transforming/rendering algorithm (for example "Acrobat Reader"). If, due to an update process, this common link should be changed (for example if the executable transforming/rendering algorithm to which said common link is pointing to is replaced by another executable transforming/rendering algorithm), there may be the problem that some of the existing multimedia data files could not be rendered anymore (i. e. the updated transforming/rendering algorithm may have problems to render those existing multimedia data files). Due to the "individual link concept", the present invention enables to maintain rendering capabilities even if new multimedia data files are added and existing transforming/rendering algorithms are changed.

Preferably, the transforming algorithm description files are encoded in a hardware independent manner. A processing unit being connected to the rendering devices and the transforming algorithm archive or the rendering device itself can then derive hardware dependent transforming algorithms being executable on respective rendering devices from a common hardware independent transforming algorithm description file stored in said transforming algorithm archive. In other words, rendering devices being based upon different hardware can derive different hardware dependent transforming algorithms from a single transforming algorithm description file. Thus, a high flexibility can be achieved.

Preferably, each executable transforming algorithm is capable of transforming data of multimedia data files having a first format into data of a second format which can be rendered by the rendering devices, respectively.

Preferably, the system comprises a memory unit being connected to the rendering devices for storing executable transforming algorithms. For example, executable transforming algorithms being generated by the processing unit may be transferred from the processing unit into the memory unit. If the rendering device needs a specific executable transforming algorithm it connects itself to the memory unit and searches for a suitable executable transforming algorithm. The memory unit can be part of the rendering device or part of the multimedia content archive or part of the transforming algorithm archive.

The system preferably comprises a link table which includes all linking information between the multimedia data files and the transforming algorithm description files, wherein the link table is stored within the multimedia content archive and/or the transforming algorithm archive and/or the rendering devices.

The linking from a multimedia data file to the transforming algorithm description files is preferably realized as a combination of a single link pointing from the multimedia data file to a link table entry of the link table and at least one link which points from the link table entry to one of the transforming algorithm description files, respectively. The wording "each stored multimedia data file is individually linked to at least one of the transforming algorithm description files" means in this context that for each stored multimedia data file at least one concatenation of two links is provided which points from the multimedia data file to one of said transforming algorithm description files, respectively. Each of said concatenations of links is an "individual link" being assigned to exactly one of said multimedia data files.

Preferably, each transforming algorithm description file comprises hardware independent functionality for analyzing data of multimedia data file, and/or hardware independent representations of transforming algorithms for transforming data of multimedia data files having a specific first format into data of a second format, and/or a hardware independent description of possible output formats into which data of a multimedia data file can be transformed when using the transforming algorithms represented in the transforming algorithm description file.

The functionality for analysing data of multimedia data files may for example be used when a multimedia data file is added to the multimedia content archive without an accompanied transforming algorithm description file. In this case the multimedia data file has to be analyzed by each analysing functionality of respective transforming algorithm description files in order to find out a transforming algorithm description file that would be able to decode the content of the multimedia data file. If no suitable transforming algorithms ("codecs") can be found in the transforming algorithm description files stored within the transforming algorithm archive and if no transforming algorithm description file is delivered with the multimedia data file, the system may block an adding process of the multimedia data file to the multimedia content archive. An additional purpose of said analysing functionality may be to verify the integrity of a multimedia data file. That is, before the content of a multimedia data file is decoded and rendered, a check may be performed by said analysing functionality whether the content of the multimedia data file can be properly processed by the transforming algorithms contained within the transforming algorithm description file which is assigned to the analysing functionality.

Multimedia data files are for example audio data files, video data files, general picture data files or container data files, wherein a container data file may comprise several audio data files, video data files, general picture data files or container data files itself However, the invention is not restricted to this. Any kind of data file which can be used in conjunction with multimedia is included within the term "multimedia data file". The term "general picture" means any kind of a visual depiction in a pixel-oriented or vector-oriented format. Photographs are for example pixel-oriented depictions, whereas drawings are an example for a vector-oriented format. A general picture contains at least one view of the content. Different views can depict the same content in different resolution, quality, type of depiction (for example viewing angle, colours scheme). A general picture can also be a multi-page document with an unrelated sequence of depictions.

Preferably, the link table provides at least one link for each multimedia data file being an audio data file, a video data file or a general picture data file which points (from a link table entry) to a transforming algorithm description file, respectively.

Preferably, the link table comprises several links for each multimedia data file being a container data file, respectively, wherein one link points (from a link table entry) to a transforming algorithm description file serving for decoding the multimedia data files contained within said container data file, and wherein, for each decodable multimedia data file, at least one link is provided which points (from a link table entry) to corresponding transforming algorithm description files, respectively. At least one of said decodable multimedia data files may be a container data file itself.

The present invention further provides a method for rendering a multimedia data file which can be performed by using a system for storing and rendering multimedia data as described above. In this method, the rendering device:
  analyzes linking information assigned to a multimedia data file to be rendered,
  analyzes transforming algorithm description files to which the linking information is pointing to,
  checks whether executable transforming algorithms corresponding to the transforming algorithm description files are already available within the rendering device and/or a memory unit connected thereto,
  generates (derives), if executable transforming algorithms are not yet available on the rendering device, an executable transforming algorithm from one of the transforming algorithm description files while making use of the processing unit (which may also be included within the rendering device),
  transforms the data of the multimedia data file into data having a suitable output format for rendering by using the executable transforming algorithm, and
  finally renders the output data.

The present invention further provides a computer program product comprising computer program means adapted to perform and/or realize the system for storing and rendering multimedia data according to the present invention, when it is executed on a computer, a digital signal processing means, or the like. Last, the present invention provides a computer readable storage means for storing a computer program product according to the present invention.

In the following description, the present invention will be explained in detail by way of example while making reference to the accompanying drawings, wherein.

Figures 2A, 2B:
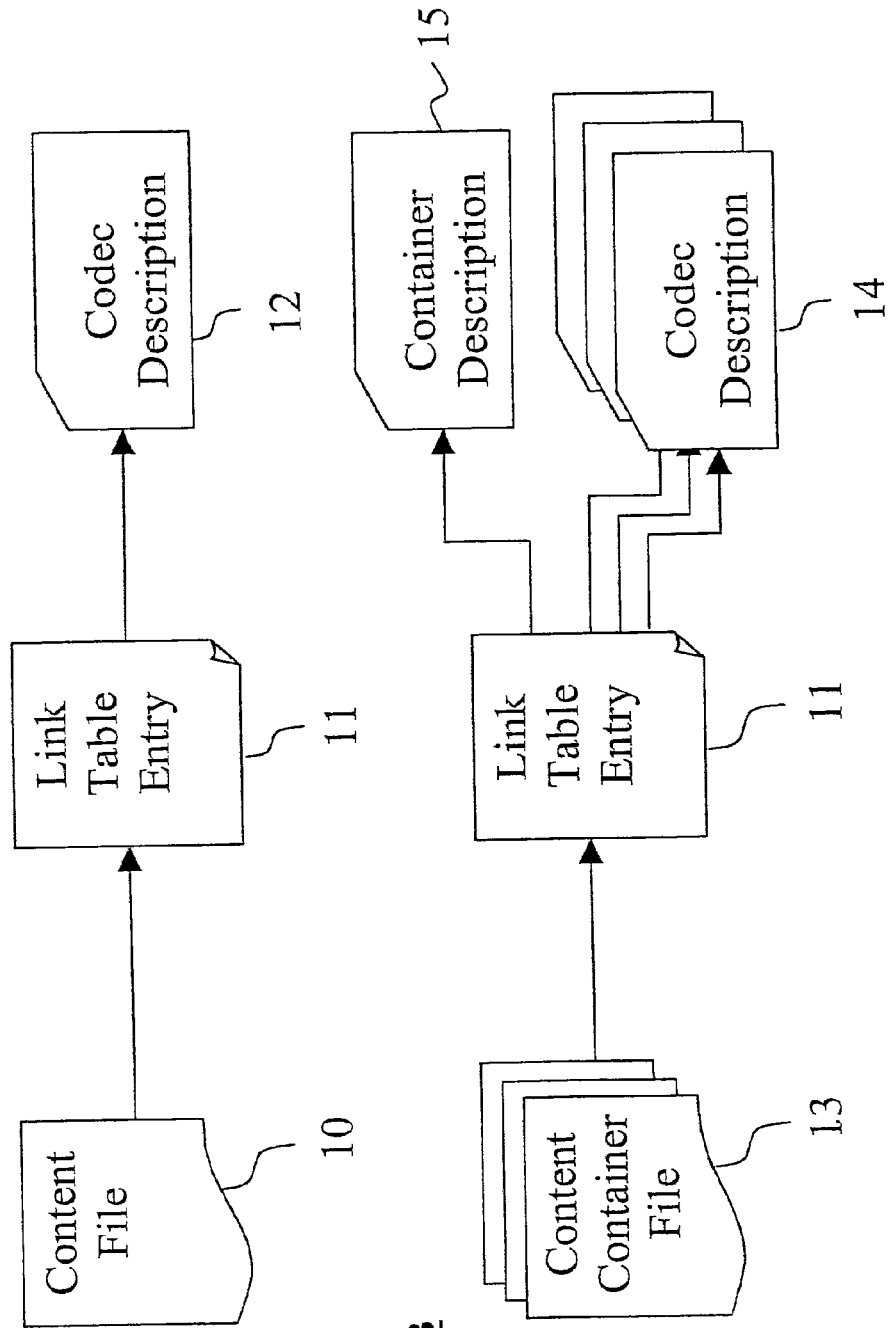
FIG. 2A shows a first embodiment of an "individual" linking concept according to the present invention.
FIG. 2B a second embodiment of an "individual" linking concept according to the present invention.
Figure 2C:
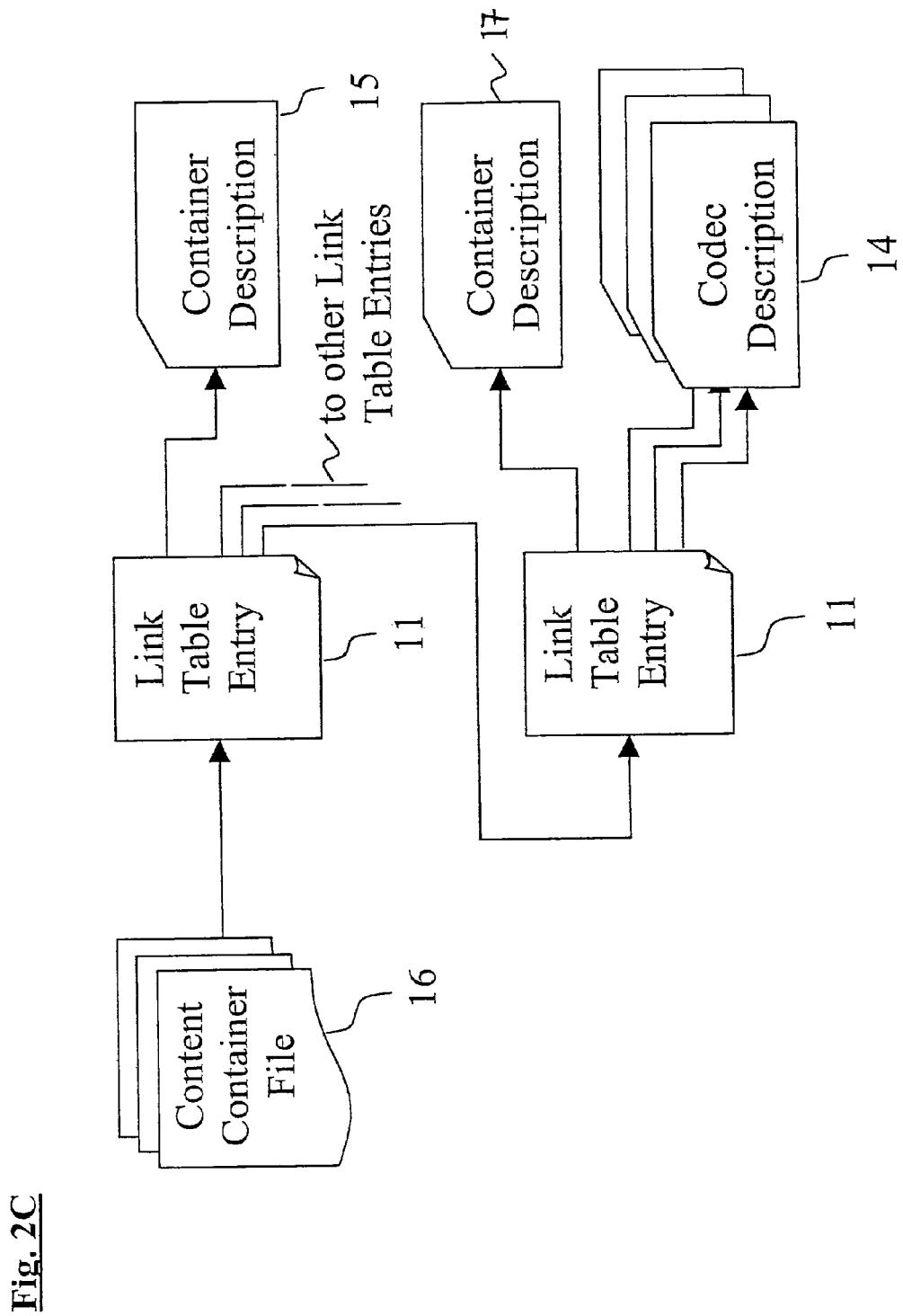

FIG. 2C a third embodiment of an "individual" linking concept according to the present invention.

Figure 1:
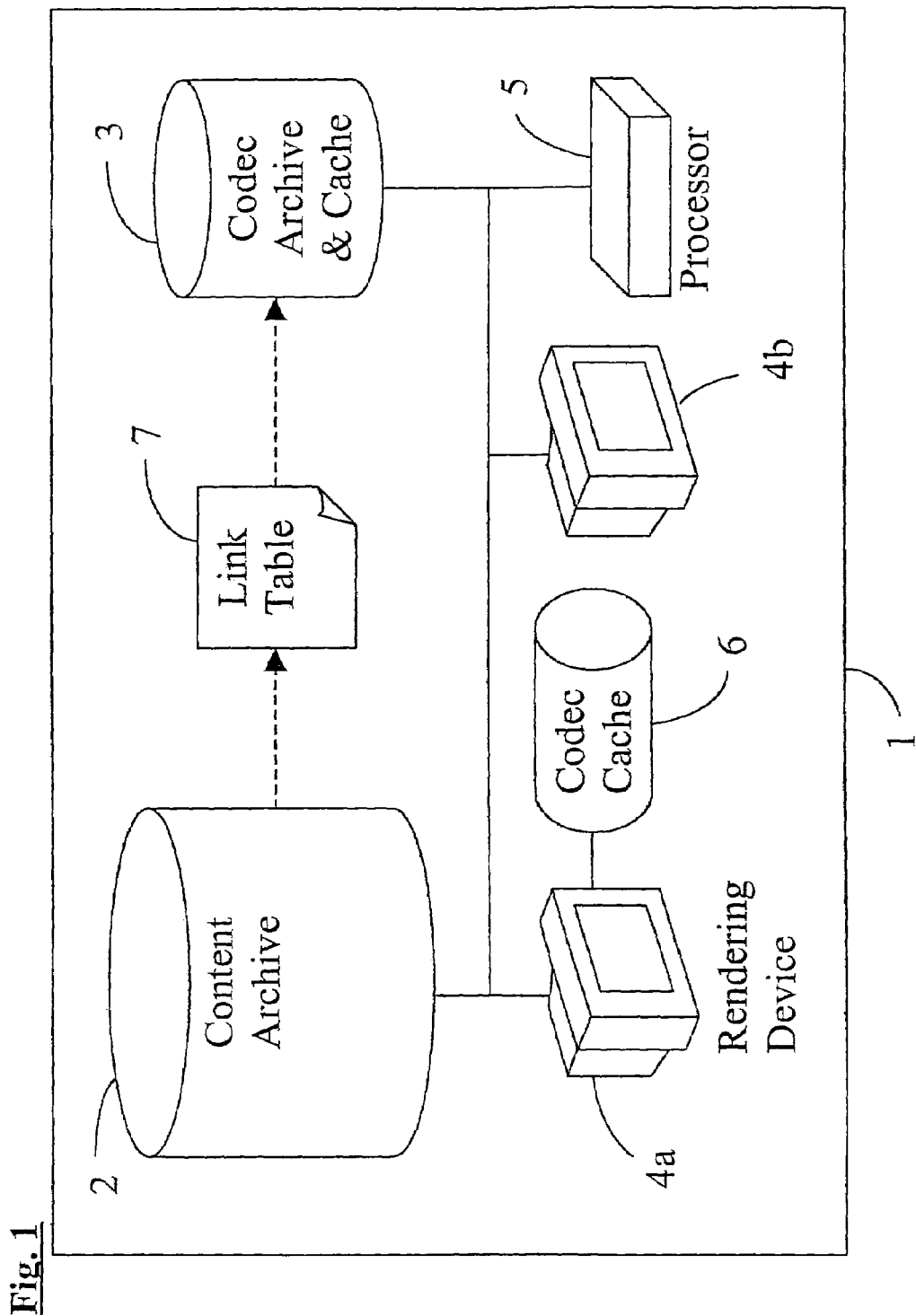
FIG. 1 shows a preferred embodiment of a system for storing and rendering multimedia data according to the present invention.

According to FIG. 1, a preferred embodiment 1 of a system for storing and rendering multimedia data comprises a multimedia content archive 2 for storing multimedia data files to be rendered, a transforming algorithm archive 3 for storing transforming algorithm description files comprising information for transforming multimedia data files of a first format into multimedia data files of a second format, and several rendering devices (here: a first and a second rendering device 4a, 4b, which are connected to the multimedia content archive 2 and the transforming algorithm archive 3, respectively). The system also comprises a processing unit 5 being connected to the first and second rendering device 4a, 4b and the transforming algorithm archive 3. The first rendering device is connected to a memory unit 6.

To each multimedia data file which is stored in the multimedia content archive 2 an individual link is assigned. Each of said links points to at least one of the transforming algorithm description files being stored in the transforming algorithm archive 3. The links may be concentrated within a link table 7 being stored within the multimedia content archive 2 and/or the transforming algorithm archive 3 and/or the rendering devices 4a, 4b.

The transforming algorithm description files being stored within the transforming algorithm archive 3 are encoded in a hardware independent manner. The processing unit 5 is capable of generating hardware dependent transforming algorithms being executable on the rendering devices 4a, 4b, from transforming algorithm description files being stored within the transforming algorithm archive 3, respectively.

Each executable transforming algorithm is capable of transforming data of multimedia data files having a specific first format into data of a second format which can be rendered by the rendering devices 4a, 4b, respectively.

The rendering process of data contained within a multimedia data file preferably is as follows:

In a first step, a rendering device (for example the first rendering device 4a) analyzes linking information assigned to a multimedia data file to be rendered. In a second step, the rendering device 4a analyzes transforming algorithm description files to which the linking information is pointing to. In a third step, the rendering device 4a checks whether executable transforming algorithms corresponding to the transforming algorithm description files are already available within the rendering device 4a and/or in the memory unit 6. If the executable transforming algorithms are not yet available on the rendering device 4a, the rendering device will invoke the processing unit 5 to generate an executable transforming algorithm from the transforming algorithm description file in a fourth step. In a fifth step, the rendering device 4a transforms the data being contained within the multimedia data file into data having a suitable output format for rendering by using the executable transforming algorithm. Finally, in a sixth step, the rendering device 4a renders the data.

Now, making references to FIGS. 2A and 2B, the principles of the inventive linking concept will be explained.

If a multimedia data file 10 is added to the multimedia content archive 2, at least one corresponding link entry within a link table 11 is set. These link entries comprise information of an "individual link" being assigned to the multimedia data file 10, respectively, each individual link pointing from the multimedia data file 10 to a transforming algorithm description file 12. In FIG. 2A, for reasons of simplicity, only one of said individual links is shown.

In the case where a container data file is added to the multimedia content archive 2, several link entries are added to the link table 11. Each multimedia data file being contained within the container data file 13 "owns" at least one individual link pointing from the respective multimedia data file to the corresponding transforming algorithm description file 14, respectively. In addition, the link table contains at least one extra entry which points to a container transforming algorithm description file 15 comprising information for decoding/extracting a transforming algorithm description file 14 from the container data file 13, respectively. In FIG. 2B, for reasons of simplicity, only one of said individual links is shown, respectively.

The purpose of the container transforming algorithm description file 15 is the following: Before individual component files of the container data file 13 can be decoded by the individually associated or linked transforming algorithms (codecs), an intermediate demultiplexing operation is required to extract the component files from the container data file 13. This demultiplexing step is accomplished by an independent transforming algorithm which is included within the container transforming algorithm description file 15. For example, a composed file or stream with audio and video interleaved is first decomposed by a transforming algorithm of the container transforming algorithm description file 15 into two separate streams, a separate video stream and a separate audio stream. The video stream can then be further decoded by the associated video transforming algorithm (codec) into a video rendering format, and similarly, the audio stream can be decoded by the associated audio transforming algorithm (codec).

The linking from a multimedia data file 10, 13 to the transforming algorithm description files 12, 14, 15 is preferably realized as a combination of a single first link pointing from the multimedia data file 10, 13 to a link table entry of said link table 7, 11 and at least one second link which points from the link table entry to one of the transforming algorithm description files 12, 14, 15, respectively.

In FIG. 2 the case is shown where no component file of the container data file 13 is a container data file itself. This possibility, however, is useful and shown in FIG. 2C. A container data file 16 ("outer" container data file) comprises several component files. One of said component files is a container data file itself ("inner" container data file). The link entry of the link table 11 which is assigned to the container data file 16 points to a container transforming algorithm description file 17 which comprises functionality to decode/extract the multimedia data files being contained within the container data file 16. Further, this link table entry comprises several other links pointing to further link table entries of the link table 11. Each of said links is assigned to one of the multimedia data files being contained within the container data file 16. In FIG. 2C, for reasons of simplicity, only the links concerning the container data file being contained within the container data file 16 are shown. These links comprise a link to a container transforming algorithm description file 15 which comprises functionality for decoding/extracting the multimedia data files being contained within the container data file ("inner" container data file) which is contained within the container data file 16 ("outer" container data file) itself. Further, the set of links concerning the inner container data file comprises links to transforming algorithm description files 14 which are assigned to the multimedia data files being included within the inner container data file. In other words: FIG. 2C shows the case where container data files are nested i. e. the component files of a container data file can be container files of usually different format by themselves. As a consequence, two different types of container transforming algorithm description files (referenced by reference numeral 15 and 17 respectively) are needed. For a multimedia data file 10 that is encoded in a recursively nested container format, the association (individual link) consists of a table entry with a link to a codec that is able to decode the container file format and a list of links to the set of seperate link table entries required for each container component embedded in the outer container file.

The invention can also be expressed as follows:

In the Microsoft Windows PC environment, the method to associate multimedia content files to rendering algorithms is performed in two stages. In a first stage, the operating system uses a mapping table of file name extensions to applications that are supposed to handle the content. The mapping between a filename extension and the application is created at installation time of the application. If there are multiple applications installed that each claim to be able to handle the contents of files with a specific file name extension, only one of these applications is associated with the file name extension. The operating system then launches the specific application associated with a certain file name extension. In a second stage the launched application analyzes the contents of the multimedia file to deduct which codec has to be used to render the content (The term "codec" means the "sum" of all information relating to a transforming algorithm which transfers multimedia data from a first format into a second format. More technically, the expression "codec" is an acronym for COmpressor/DDCompressor, or formerly COder/DECoder. The compression or coding operation transforms the data into a format that is more suitable for storing or transmitting for example due to the reduction of the data size. The reverse decompression or decoding operation transforms the data back to the original data formate that allows the rendering of the content by a rendering device). If the application does not have the appropriate codec executable installed and if the computer is connected to the internet, the application tries to retrieve an appropriate codec executable from a central server. The codec retrieval will only be successful if the server can provide the appropriate codec that can be executed by the machine architecture that also executes the rendering application. If no appropriate codec executable is installed in the system and also no appropriate codec executable could be retrieved from an internet server, the application notifies the user that the content cannot be rendered. Examples for an application are the Microsoft Media Player and the RealOne Player.

Digital multimedia content for CE devices or PCs uses an ever-increasing number of data formats. New content formats will require existing rendering devices to be updated with new codecs to be able to render the content, which can have adverse effects to the accessibility of archived content encoded in a legacy format. New rendering devices need to support an increasing number of legacy formats. Once the support for a legacy data-encoding format is dropped, the ability of the rendering device to access and decode the data created in this format is lost.

That is, in the consumer electronics (CE) environment, the capability of a device is usually fixed. A device can only decode content in a limited number of codec formats that are supported by the vendor by design. If a new codec format is established in the market, the existing device cannot be used for this content.

To avoid adverse effects due to updating a content rendering device with a new codec, according to the present invention, a content archive is supplemented with an archive of codec descriptions, and a link table that associates each content file in the content archive with the appropriate set of codecs in the codec archive. To ensure long-term accessibility to the content in case the rendering device is replaced with a next generation device, the codecs required are archived in a high-level description. A processor then derives a codec executable from the high-level description for a rendering device.

The proposed solution is composed of an archive of multimedia content files, an archive of codec descriptions, a link table for associations between multimedia content files and meta-codecs, and a plurality of rendering devices for rendering of the multimedia content. For the basic principle of this invention, it does not matter if the aforementioned items are separated into different devices or build a single device together.

The content archive contains a plurality of multimedia content files, each file encoded in one of a plurality of file formats. File formats can be categorized into audio formats, video formats, general picture formats, and container formats. The latter allows for file formats to be nested, i.e. a file in a container format can contain a plurality of files in different file formats. This is frequently used for AV files, which contain at least one file in a video format together with at least one file in an audio format.

The codec archive contains a plurality of codec descriptions for all of the formats in use in the content archive. A codec description is composed of at least a method to analyze the data in a content file, a description of output formats supported by the codec, and a plurality of methods to decode the content data into one of the supported output formats. A suitable embodiment is to represent the codec description in a hierarchical structure, such as an XML document.

The description of supported output formats indicates the type of the output data, e.g. audio, video, still picture, or files extracted from a container. It also indicates the resolution of output samples. In case of video or picture data the description also indicates the output color space.

The method to analyze the content data results in an indication whether the codec is able to decode the analyzed data properly, or not.

The method to decode the content data into one of the supported output formats is a hardware or implementation independent description of the decoder algorithm. This implementation independent description is used later to instantiate a codec for the specific rendering device that accesses the content data. The description is the decoder algorithm coded in one of a plurality of coding languages that the processor can transform to a device specific executable.

The link table contains a representation of associations between a file in the content archive and a set of codec descriptions in the codec archive. For any content file that is not encoded in a container format, the association consists of a table entry with a single link to the codec to be used for properly decoding the content data. For a content file that is encoded in a container format, the association consists of a table entry with a link to a codec that is able to decode the container file format and a list of links to the set of codecs required for each file embedded in the container file.

A rendering device renders the multimedia content. A rendering device can render at least one type of decoded content, i.e. audible, or visual, or haptic content, or both.

The processor maintains the content archive, the codec archive, the link table, and the conversion of the codec description into a codec executable that can be instantiated in the rendering device.

The process of rendering a content file from the content archive on a specific client can be outlined as follows:

a. The rendering device selects the content file and reads the link table entry associated with the content file.

b. The rendering device reads the set of codec descriptions referenced from the link entry.

c. The rendering device checks the codec cache for codec executables that are appropriate for the machine architecture of the rendering device.

d. For each codec for which no machine executable exists in the codec cache, the processor is invoked to transform the machine independent codec description into a machine dependent executable.

e. The rendering device loads the codec executables, reads the content file, decodes the content data to one of the supported output formats, and finally renders the decoded output data.

The system for storing and rendering multimedia data according to the present invention shows the following advantages:

Every content file that is entered into the content archive is at that time associated with the appropriate set of codecs required to properly render the content at a later stage. This association will never be removed as long as the content is kept in the content archive. Also, no codec is removed from the archive as long as there is at least one content file referencing the codec. Therefore, the addition of new content requiring new codecs will have no adverse effect on the already existing content-codec associations. In contrast, in the PC environment, the association is not per single file but per file name extension. Changing the association for a new content file will affect the ability to render existing content in the archive.

Since the codecs are archived as an implementation independent description of the decoder algorithm, it is not necessary to know at the time a new codec is added to the codec archive on which rendering device the content will be rendered at a later stage.

When a next generation rendering device with internal machine architecture distinct from existing legacy devices is connected to the content archive, the proposed invention ensures that codec executables can be generated from the codec descriptions archived in the codec archive.

There is no need to migrate existing content encoded in a legacy format to a new encoding format in order to enable a new rendering device to access and render the content.

As has become apparent, the concept of the link table preferably involves one individual link pointing from a content file to a link table entry, plus a set of links pointing from the link table entry to transforming algorithm description files, with said set consisting of at least one link.

REFERENCE SYMBOLS

1 System
2 Multimedia content archive
3 Transforming algorithm archive
4a First rendering device
4b Second rendering device
5 Processing unit
6 Memory unit
7 Link table
10 Multimedia data file
11 Link table
12 Transforming algorithm description file
13 Container data file
14 Transforming algorithm description file
15 Container transforming algorithm description file
16 Container data file
17 Container transforming algorithm description file

The invention claimed is:

1. A system, comprising:
a first storage adapted to store multimedia data files of a plurality of formats,
a second storage adapted to store non-executable program descriptions comprising information specifying a transformation of multimedia data files of a first format into multimedia data files of a second format, wherein said first format is a format of said plurality of formats,
a rendering device adapted to render multimedia data files of said second format,
wherein at least one of said multimedia data files stored in said first storage is linked to at least one of said non-executable program descriptions, said one of said non-executable program descriptions comprising information regarding a transformation of multimedia data files of the format of said at least one of said multimedia data files into said second format, and
at least one of said multimedia data files is a container data file comprising a plurality of further multimedia data files, said container data file being linked to a plurality of said non-executable program descriptions, wherein one of said plurality of said non-executable program descriptions specifies a transformation of the container data file, and wherein the other of said plurality of said non-executable program descriptions specify transformations of said further multimedia data files comprised within said container data file.

2. The system according to claim 1, wherein said program descriptions are encoded in a hardware independent manner.

3. The system according to claim 2, comprising a processing unit adapted to generate executable code based on a respective non-executable program description, wherein said executable code is executable by said rendering device.

4. The system according to claim 3, wherein said executable code transforms said multimedia data files of said first format into said multimedia data files of said second format.

5. The system according to claim 3, comprising a third storage connected to said rendering device and adapted to store said executable code.

6. The system according to claim 1, further comprising a link table including linking information linking said at least one of said multimedia data files to said at least one of said non-executable program descriptions, wherein said link table is stored within said first storage, said second storage and/or said rendering device.

7. The system according to claim 6, wherein said linking information comprises a first link from said at least one of said multimedia data files to a respective entry of said link table, and at least one second link from said respective entry of said link table to said at least one of said non-executable program descriptions.

8. The system according to claim 1, wherein at least one of said non-executable program descriptions comprises hardware independent functionality which is used to analyze data of said multimedia data files.

9. The system according to claim 1, wherein at least one of said multimedia data files is an audio data file, a video data file and/or a general picture data file.

10. The system according to claim 9, wherein each of said multimedia data files being an audio data file, a video data file or a general picture data file is linked to said at least one of said non-executable program descriptions.

11. The system according to claim 1, wherein at least one of said multimedia data files comprised in said container data file is a further container data file.

12. The system according to claim 1, wherein at least one of said non-executable program descriptions comprises a hardware independent representation of a transforming algorithm which is used for said transformation of said multimedia data files of said first format into said multimedia data files of said second format.

13. The system according to claim 1, wherein at least one of said non-executable program descriptions comprises a description of said second format stored in an XML document.

14. The system according to claim 1, wherein at least one of said multimedia data files is a container data file comprising a set of said multimedia data files.

15. A method of rendering a multimedia data file, comprising:
providing a multimedia data file of a first format;
providing non-executable program instructions for a transformation of said multimedia data file of said first format into a multimedia data file of a second format, wherein said second format is used for rendering said multimedia data file;
generating executable code based on said non-executable program instructions;
transforming said multimedia data file of said first format into said multimedia data file of said second format by executing said executable code; and
rendering said multimedia data file of said second format, wherein
at least one of said multimedia data files is a container data file comprising a plurality of further multimedia data files, said container data file being linked to a plurality of said non-executable program instructions, wherein one of said plurality of said non-executable program instructions specifies a transformation of the container data file, and wherein the other of said plurality of said non-executable program instructions specify transformations of said further multimedia data files comprised within said container data file.

16. The method of claim 15, further comprising:

analyzing linking information, wherein said linking information links said multimedia data file to non-executable program descriptions comprising said non-executable program instructions;

checking whether a respective executable code for transforming said multimedia data file of said first format into said multimedia data file of said second format is available in a first storage, wherein said respective executable code corresponds to at least one of said non-executable program descriptions linked to said multimedia data file; and generating, if said respective executable code is not available in said first storage, said respective executable code based on said non-executable program instructions.

17. The method of claim 16, further comprising:

transmitting said non-executable program instructions from a second storage to said first storage via a data bus.

18. The method of claim 17, further comprising:

transmitting said executable code to a rendering device adapted to render said multimedia data file of said second format via said data bus.

19. A method for storing and rendering multimedia data, comprising:

providing a multimedia data file of a first format;

checking whether a non-executable program description comprising program code adapted to transform said multimedia data file of said first format into a transformed multimedia data file of a second format is available, wherein said second format is used for rendering said transformed multimedia data file;

storing, if said non-executable program description is available, said multimedia data file in a first storage and said non-executable program description in a second storage;

adding linking information linking said multimedia data file with said non-executable program description;

providing a multimedia data file which is a container data file comprising a plurality of further multimedia data files; and linking said container data file to a plurality of non-executable program descriptions. wherein one of said plurality of said non-executable program descriptions specifies a transformation of the container data file, and the other of said plurality of said non-executable program descriptions specify transformations of said further multimedia data files comprised within said container data file.

20. The method for storing and rendering multimedia data according to claim 19, further comprising:

checking whether said multimedia data file is a container data file comprising other multimedia data files;

checking whether for each multimedia data file comprised in said container data file and being of a respective first format, a respective non-executable program description comprising non-executable program instructions specifying a transformation of said respective multimedia data file of said respective first format into a respective transformed multimedia data file of a respective second format is available, wherein said respective second format is used for rendering said respective transformed multimedia data file;

storing, if for each multimedia data file comprised in said container data file, said respective non-executable program description is available, said multimedia data files comprised in said container data file in said first storage and storing respective non-executable program descriptions in said second storage; and adding linking information linking said multimedia data files with said respective non-executable program descriptions.

21. A computer-readable recording medium encoded with instructions, wherein the instructions when executed by a computer, cause the computer to execute a method of rendering a multimedia data file, the method comprising:

providing a multimedia data file of a first format;

providing non-executable program instructions for a transformation of said multimedia data file of said first format into a multimedia data file of a second format, wherein said second format is used for rendering said multimedia data;

generating executable code based on said non-executable program instructions;

transforming said multimedia data file of said first format into said multimedia data file of said second format by executing said executable code; and rendering said multimedia data file of said second format, wherein at least one of said multimedia data files is a container data file comprising a plurality of further multimedia data files, said container data file being linked to a plurality of said non-executable program instructions, wherein one of said plurality of said non-executable program instructions specifies a transformation of the container data file, and wherein the other of said plurality of said non-executable program instructions specify transformations of said further multimedia data files comprised within said container data file.

* * * * *